(12) United States Patent
Morrow, Sr.

(10) Patent No.: US 6,256,388 B1
(45) Date of Patent: Jul. 3, 2001

(54) SANITIZING DEVICE FOR A TELEPHONE HANDSET

(76) Inventor: Tommie L. Morrow, Sr., 4120 Fortitude Ct., Florissant, MO (US) 63034

( * ) Notice: Subject to any disclaimer, the term of this patent is extended or adjusted under 35 U.S.C. 154(b) by 0 days.

(21) Appl. No.: 09/232,911

(22) Filed: Jan. 15, 1999

(51) Int. Cl.[7] .................................................. H04M 1/00
(52) U.S. Cl. .................................... 379/452; 379/439
(58) Field of Search ................................. 379/452, 439, 379/451, 437, 447

(56) References Cited

U.S. PATENT DOCUMENTS

| | | | |
|---|---|---|---|
| D. 157,120 | 2/1950 | Backie | D26/14 |
| 1,564,748 | 12/1925 | Barrett . | |
| 2,650,269 * | 8/1953 | Webb | 379/452 |
| 2,763,735 | 6/1956 | Wahl | 179/185 |
| 2,766,333 | 10/1956 | Bivins | 179/185 |
| 4,329,548 | 5/1982 | Strassburg | 179/185 |
| 4,819,264 * | 4/1989 | Lemley | 379/452 |
| 4,876,715 | 10/1989 | Neubert | 379/452 |
| 5,396,557 | 3/1995 | Tonci | 379/452 |
| 5,550,918 | 8/1996 | Zdanov | 379/452 |

* cited by examiner

Primary Examiner—Jack Chiang
(74) Attorney, Agent, or Firm—Grace J. Fishel

(57) ABSTRACT

A sanitizing device for a telephone handset having a mouthpiece and an earpiece. The device has a pair of receptacles each of which has a plate that when pressed by the mouthpiece or earpiece rotates, scrubbing the outer surface of the mouthpiece and the earpiece. In a preferred form, a compartment is attached to each of the receptacles. A roll of material treated with a disinfectant is journaled in each compartment and is dispensed as sheets as the mouthpiece and the earpiece are pressed against the plates. The sheets then rotate with the plates, scrubbing the outer surface of the mouthpiece and the earpiece with disinfectant.

5 Claims, 3 Drawing Sheets

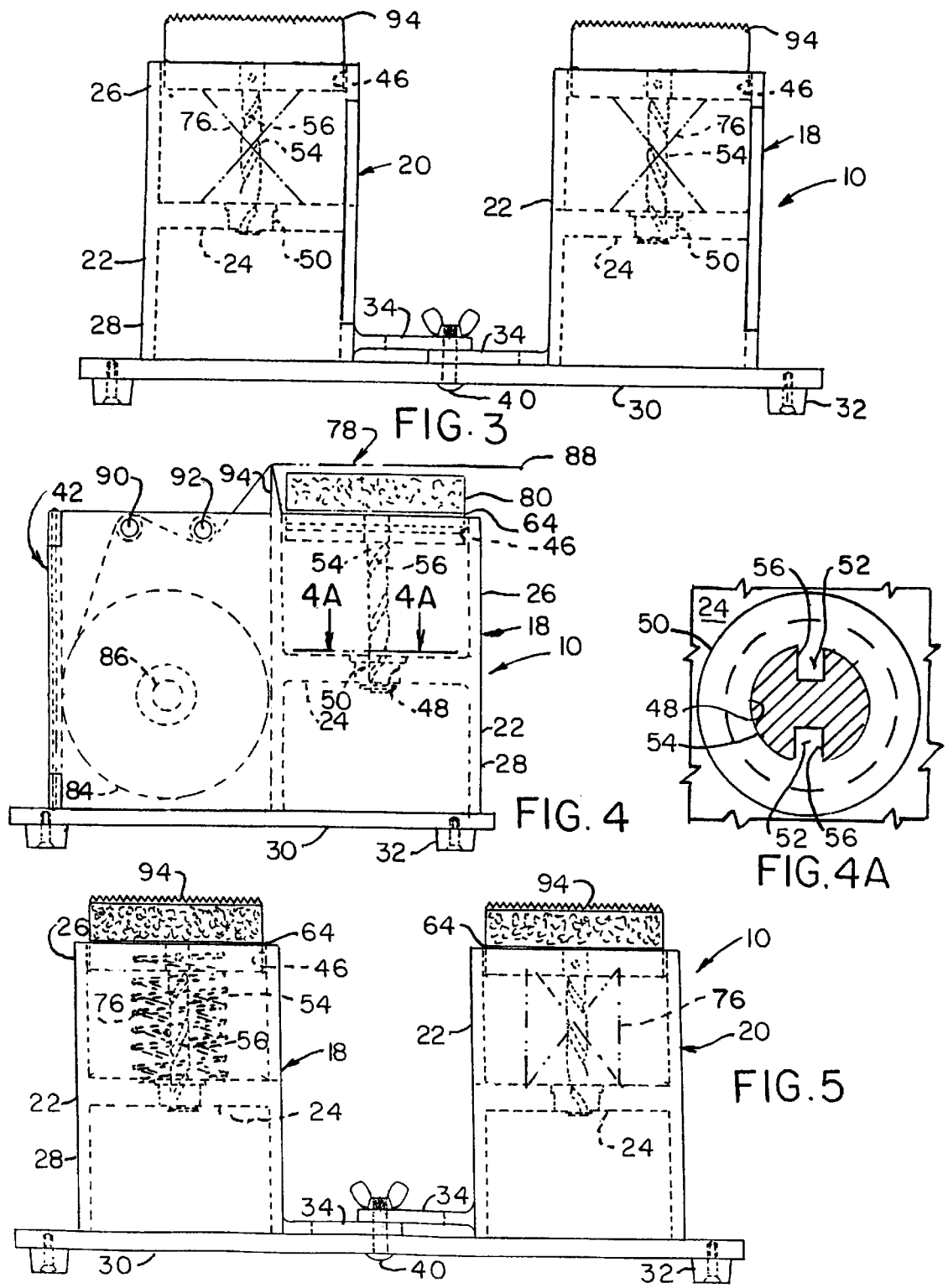

SANITIZING DEVICE FOR A TELEPHONE HANDSET

BACKGROUND OF THE INVENTION

1. Field of the Invention

The present invention relates to a sanitizing device for scrubbing an inside surface of a mouthpiece and an earpiece of a telephone handset with a disinfectant to prevent the spread of disease.

2. Brief Description of the Prior Art

There is a possibility that a prior user making intimate contact with a mouthpiece and an earpiece of a telephone, particularly a public telephone, may transfer germs that could be spread to a subsequent user positioning the mouthpiece and earpiece in the immediate vicinity of his or her mouth and ears. While the possible spread of disease through public telephones has been a concern for years, no commercially successful device for sanitizing a telephone handset has been developed. Further work is motivated by the increased resistance of germs to antibiotics, making the best treatment, prevention of infection by use of disinfectants.

Prior art sanitizing devices for a telephone handset have been of four types. A first type provides a pad or cup which is attached to the mouthpiece or earpiece by the subsequent user. The pad or cup may be treated with a disinfectant but muffles the sound. Another type of device applies a pressurized or gaseous disinfectant when the handset is placed in a cradle. Gaseous disinfectants have not proven satisfactory due to potential mechanical problems with the activation mechanism as well as due to the present concern relating to propellants and inhaling the disinfectant. A third type of sanitizing device makes use of a source of germicidal rays such as an ultraviolet lamp. This system, however, requires a source of electrical energy not commonly available at public pay telephones. The last kind of sanitizing device uses a sponge impregnated with a liquid disinfectant somehow wicked or otherwise supplied to the pad to keep it wet. This type of device tends to dry out and the sponge gets dirty, even if it is wet with disinfectant, as those bacteria resistant to the disinfectant, potentially even more virulent to a subsequent user, tend to multiply. In addition, none of the prior art devices provides a means for scrubbing the mouthpiece or earpiece.

BRIEF SUMMARY OF THE INVENTION

In view of the above, it is an object of the present invention to provide a sanitizing device for a telephone handset that scrubs the outside surface of the mouthpiece and earpiece as they are inserted into the device. Other objects and features of the invention will be in part apparent and in part pointed out hereinafter.

In accordance with the invention, a sanitizing device for a telephone handset having a mouthpiece and an earpiece has a pair of receptacles, each of which has a perimetrical wall and an internal transverse partition wall. The perimetrical wall has an opening at a first end for receivably surrounding the mouthpiece or the earpiece and the partition wall has an aperture in which is mounted a nut with at least one radial finger. A shaft, with first and second ends and at least one spiraled groove in which said finger freely slides, is threaded in the nut. The shaft has first and second ends and a stop on the first end of the shaft for preventing removal of the shaft from the nut. A plate, adapted to engage an outer surface of the mouthpiece or the earpiece, is mounted on the second end of the shaft for rotation with the shaft. A spring is provided between the nut and the second end of the shaft for biasing the shaft towards contact between the stop and the nut.

From a starting position, when the mouthpiece and the earpiece are inserted into the first end of the receptacles and pressed against the plates, the springs compress and the shafts retract in the nuts, rotating the plates against the outer surface of the mouthpiece and the earpiece. Then when the mouthpiece and the earpiece are removed from the plates, the springs expand and the shafts extend back into starting position.

For application of a disinfectant to the outer surface of the mouthpiece and the earpiece, a sheet of material with a disinfectant is preferably provided for use on the plates in scrubbing the outer surface. While the sheet may be supplied as a stack of nested or Z-folded sheets, it is preferred that they be provided on a roll housed in compartments attached to each of the receptacles. The second end of the receptacles may be outfitted with a serrated edge or the like that cuts the roll into sheets as the mouthpiece and the earpiece are pressed against the plates. More preferably, however, the sheets are perforated.

The invention summarized above comprises the constructions hereinafter described, the scope of the invention being indicated by the subjoined claims.

BRIEF DESCRIPTION OF THE SEVERAL VIEWS OF THE DRAWINGS

In the accompanying drawings, in which one of various possible embodiments of the invention is illustrated, corresponding reference characters refer to corresponding parts throughout the several views of the drawings in which:

FIG. 3 is a back elevation of the device showing a serrated edge for cutting the roll into sheets and with a rotating shaft and plate shown in broken lines;

FIG. 4 is a side elevation of the device and an attached compartment with the shaft and plate and the roll of sheets shown in broken lines;

FIG. 4A is a section, on an enlarged scale, taken along line 4A—4A in FIG. 4 with portions of a transverse partition wall broken away;

FIG. 5 is a front elevation of the device with the rotating shaft and plate shown in broken lines;

DETAILED DESCRIPTION OF THE INVENTION

Figure 1:
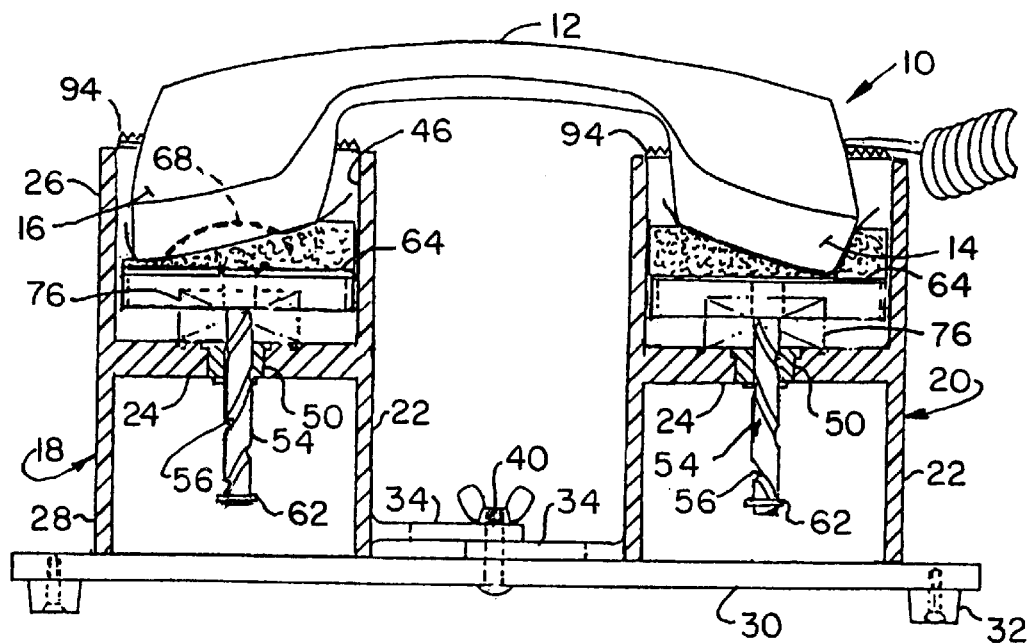
FIG. 1 is a sectional view taken along line 1—1 in FIG. 2 showing a sanitizing device for telephone handsets in accordance with the present invention.

Referring to the drawings more particularly by reference character, reference numeral 10 refers to a sanitizing device in accordance with the present invention. As seen in FIG. 1, device 10 is for use with a telephone handset 12 having a mouthpiece 14 and an earpiece 16.

Figure 2:
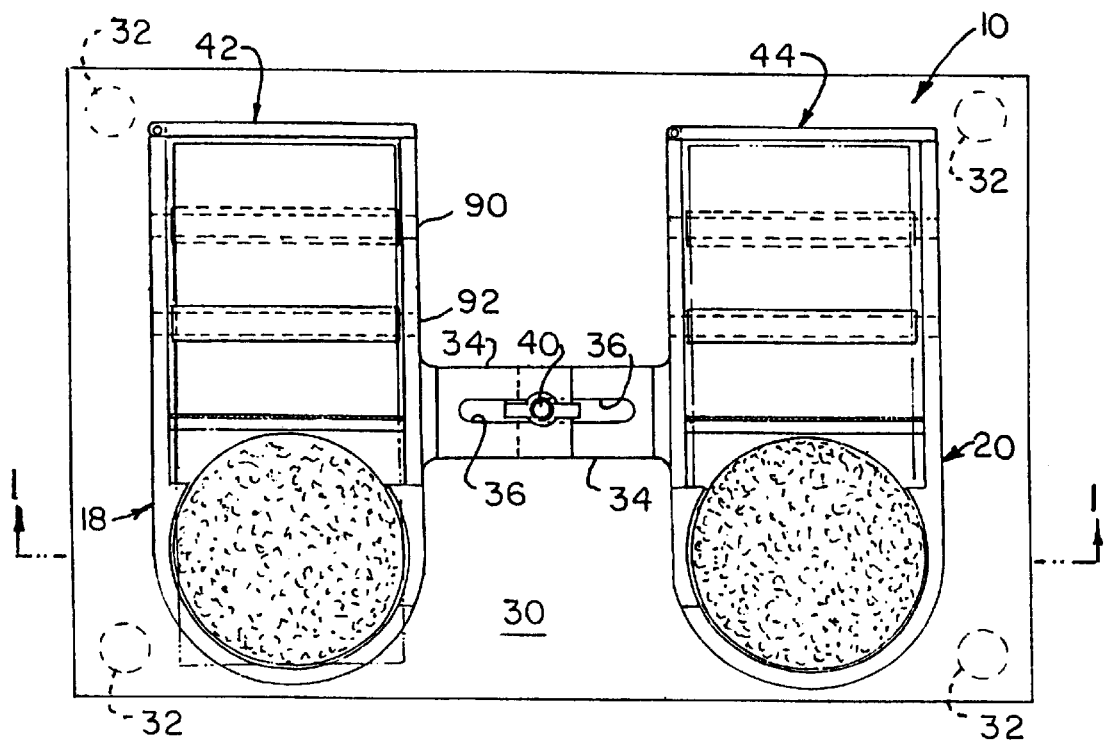
FIG. 2 is a plan view of the device with an attached compartment with a roll of disinfectant carrying sheets.
Figure 6:
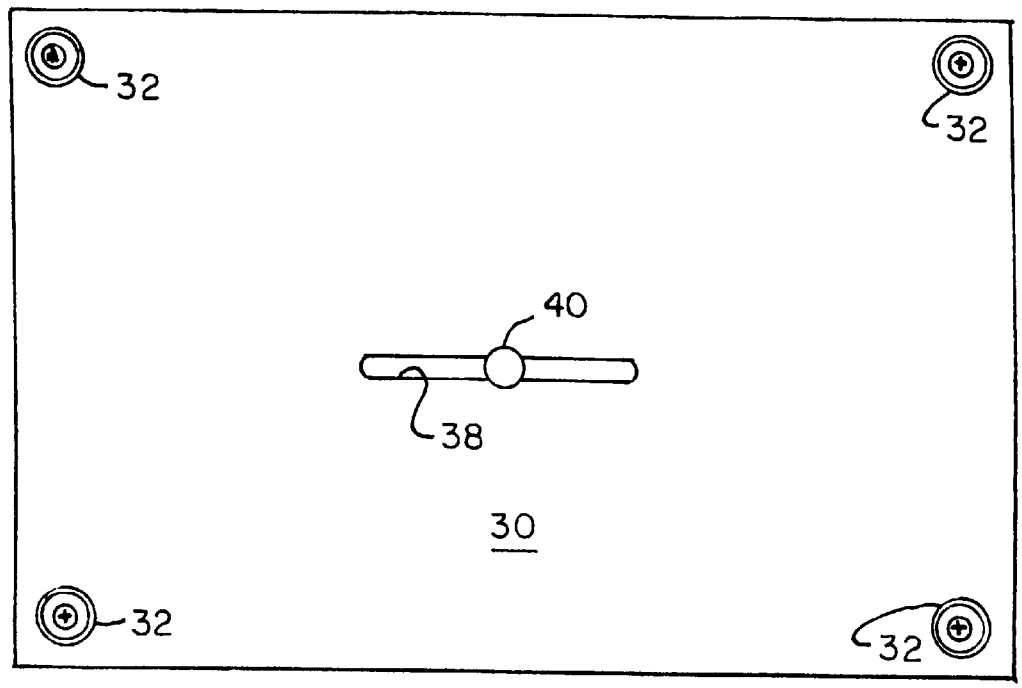
FIG. 6 is a bottom view of a mounted plate.

With added reference to FIGS. 3 and 5, it will be seen that device 10 has a pair of receptacles 18, 20, each of which has a perimetrical wall 22 and a transverse partition wall 24. In the form illustrated in the drawings, receptacles 18, 20 are generally rectangular in shape with a first end 26 and a second, open end 28 mounted on a plate 30. Plate 30 may be attached to a wall adjacent a pay telephone or the like or sat upon a support surface on feet 32 provided on the underside of plate 30 and seen in FIGS. 1–6. A strap 34 is attached to perimetrical wall 22 of each receptacle for attachment to a corresponding strap 34 on the other receptacle. Each of straps 34 has an elongated slot 36 (FIG. 2), as does plate 30 at 38 (FIG. 6), for receipt of a bolt 40 by means of which receptacles 18, 20 are attached to plate 30 and the spacing between receptacles 18, 20 may be adjusted to accommodate various sizes of telephone handsets 12. As shown in FIGS. 2 and 4, each of receptacles 18, 20 may have an attached compartment 42, 44, respectively, for use as more particularly described below.

Perimetrical wall 22 of each of receptacles 18, 20 has an opening 46 at first end 26 for receivably surrounding mouthpiece 14 or earpiece 16 of handset 12. Opening 46 may be square in cross-section and simply be an open end of perimetrical wall 22 at its first end 26, as shown in the drawings, or circular to accommodate a handset having a round mouthpiece and earpiece, although different shaped openings 46 may be used with receivers of a different shape. Transverse partition wall 24 has an aperture 48 in which is mounted a nut 50 with at least one, radially directed finger 52. A shaft 54 with at least one spiraled groove 56 in which finger 52 freely slides is threadedly received in nut 50 for longitudinal movement within the receptacle. Spiral groove 56 is coarse and has a steep pitch such that shaft 54 revolves freely in nut 50. For smoother operation, it will be understood that more than one groove 56 may be provided and that nut 50 may have more than one finger 52, each of which may be slidably received in a groove. No benefit, however, may be achieved by using more than two diametrically opposed grooves and fingers.

Shaft 54 (FIG. 10) has first and second ends 58, 60, respectively. A stop 62 such as a snap ring, etc. is provided on first end 58 to prevent the removal of shaft 54 from nut 50 and, preferably, to prevent extension of shaft 54 beyond first end 26 of perimetrical wall 22. A plate 64 is mounted on second end 60 of shaft 54 for rotation with the shaft. Plate 64 has an upper surface 66 adapted to engage an outer surface 68 of mouthpiece 14 or earpiece 16 and is preferably round, although may be of other shapes.

Figure 9:
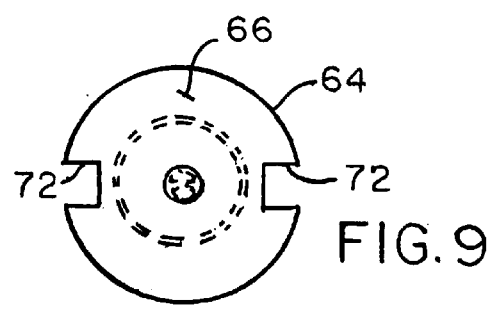
FIG. 9 is a plan view of a plate adapted to engage an outer surface of the mouthpiece and earpiece; and, FIG. 10 is a side view of the plate.
Figure 10:
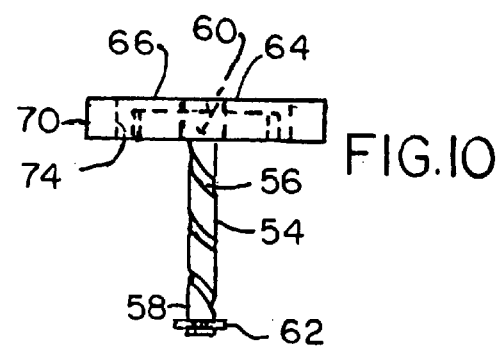

As shown in the drawings and best seen in FIGS. 9–10, plate 64 has a skirt 70 and a pair of diametrically opposed notches 72, an inner side of which is bent down forming a tab 74. A spring 76, which for purposes of illustration is shown as a coil spring, but which could be a leaf spring, rubber bumper, air cylinder, etc., is positioned between transverse partition 24 and plate 30 biasing shaft 54 towards full extension and stop 62 towards contact with nut 50. When spring 76 is a coil spring, it may be threaded over shaft 54 with its upper end confined within tabs 74 so that the spring remains aligned with shaft 54 and the mechanism does not bind.

In use, device 10 may be positioned proximate any telephone, particularly a public telephone, providing a means for a user to scrub mouthpiece 14 and earpiece 16 of handset 12 prior to using the telephone. From a starting position, with plate 64 at or slightly elevated above first end 26 of perimetrical wall 22, device 10 may be operated by pressing outer surface 68 of mouthpiece 14 and earpiece 16 into engagement with plates 30. When device 10 is mounted on a generally horizontal surface, the weight of handset 12 compresses springs 76 causing shafts 54 to retract in nuts 50, rotating plates 64 against outer surface 68 of mouthpiece 14 and earpiece 16. If device 10 is mounted on a generally vertical surface, the user may push mouthpiece and earpiece against plates 64, depressing springs 76 and causing shafts 54 to rotate plates 64 as described above. When the pressure on plates 64 is released, springs 76 cause shafts to extend, rotating plates in the opposite direct back into the starting position.

Figure 7:
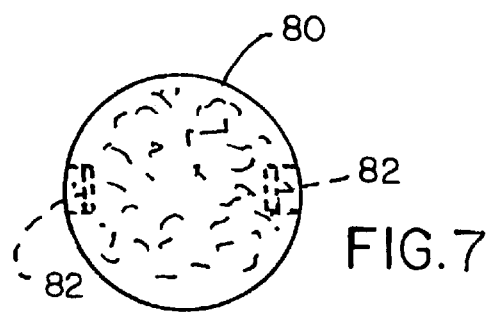
FIG. 7 is a plan view of a resilient pad to which the sheets cling.
Figure 8:
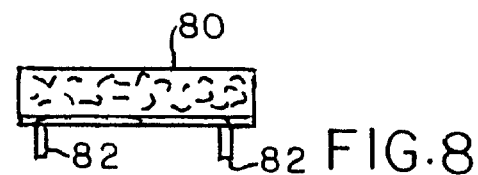
FIG. 8 is a side view of the resilient pad.

For application of a disinfectant to outer surface 68 of mouthpiece 14 and earpiece 16, a sheet 78 of material with a disinfectant is preferably provided. As shown in FIG. 4, sheet 78 is underlain with a resilient pad 80 attached to upper side 66 of plate 64. Pad 80, best seen in FIGS. 7–8, is sufficiently spongy that it conforms to outer surface 68, pressing sheet 78 fully into contact with said surface. Pad 80 may be attached to plate 64 with a pair of depending lugs 82 which are received in notches 72 of plate 64. Pad 80 is preferably formed of a self-skinned material or the like which does not absorb the disinfectant or otherwise become fouled with use.

While sheet 78 may be supplied as a stack of nested or Z-folded sheets, it is preferred that they be provided on a roll 84 in each of compartments 42, 44 as shown in FIGS. 2 and 4. Roll 84 is supported for rotation in compartments 42, 44 on an axle 86 journaled into opposite sidewalls of the compartment. A leading end 88 of roll 84 is passed over a first roller 90 and under a second roller 92. From second roller 92, leading end 88 is passed over a serrated edge 94 on first end of perimetrical wall 22 above plates 64. In use, when roll 84 is unwound such that the material overlies resilient pad 80, as mouthpiece 14 and earpiece 16 are pushed against plates 64, serrated edge 94 cuts the material into sheets 78 which rotate with plates 64. When sheets 78 on roll 84 are perforated, serrated edge 94 is not needed, as the sheets will be torn loose as plates 64 begin to rotate. The friction between sheets 78 and pads 80 is sufficient to keep sheets rotating with plates 64, outer surface 68 of mouthpiece 14 and earpiece 16 being smooth and slick. Rolls 84 may be wetted with a disinfectant and enclosed within compartments 42, 44 to keep them from drying out. While a wet sheet 78 may be preferred for more effectively scrubbing outer surface 68 of mouthpiece 14 and earpiece 16, rolls 84 may also be coated with a dry disinfectant that does not need to be protected from drying.

In view of the above, it will be seen that device 10 provides a means for scrubbing the mouthpiece and earpiece of a telephone handset without need for a source of electrical energy. It is also seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A sanitizing device for a telephone handset having a mouthpiece and an earpiece, said device comprising a pair of receptacles, each of said receptacles having a perimetrical wall and an internal transverse partition wall, said perimetrical wall having an opening at a first end for receivably surrounding the mouthpiece or the earpiece and said partition wall having an aperture in which is mounted a nut with at least one finger and a shaft with at least one spiraled groove in which said finger freely slides, said shaft having first and second ends, a stop on the first end of the shaft for preventing removal of the shaft from the nut and a plate mounted on the second end of the shaft for rotation with the shaft, said plate adapted to engage an outer surface of the mouthpiece or the earpiece, a spring between the nut and the second end of the shaft for biasing the shaft towards contact between the stop and the nut, whereby, from a starting position, when the mouthpiece and the earpiece are inserted into the first end of the receptacles and pressed against the plates, the springs compress and the shafts retract in the nuts, rotating the plates against the outer surface of the mouthpiece and the earpiece, and then when the mouthpiece and the earpiece are removed from the plates, the springs expand and the shafts extend back into starting position.

2. The device of claim 1 wherein the spring is a coil spring threaded over the shaft and the plate has depending tabs that confine an upper end of the spring between the tabs so that the spring remains aligned with the shaft.

3. The device of claim 1 wherein a resilient pad is mounted on an upper surface of the plates, said pad adapted to grip a sheet of a material treated with a disinfectant such that the sheet rotates with the pad and the plate.

4. A sanitizing device for a telephone handset having a mouthpiece and an earpiece, said device comprising a pair of receptacles, each of said receptacles having a perimetrical wall and an internal transverse partition wall, said perimetrical wall having an opening at a first end for receivably surrounding the mouthpiece or the earpiece and said partition wall having an aperture in which is mounted a nut with at least one finger and a shaft with at least one spiraled groove in which said finger freely slides, said shaft having first and second ends, a stop on the first end of the shaft for preventing removal of the shaft from the nut and a plate mounted on the second end of the shaft for rotation with the shaft, said plate adapted to engage an outer surface of the mouthpiece or the earpiece, a spring between the nut and the second end of the shaft for biasing the shaft towards contact between the stop and the nut, whereby, from a starting position, when the mouthpiece and the earpiece are inserted into the first end of the receptacles and pressed against the plates, the springs compress and the shafts retract in the nuts, rotating the plates against the outer surface of the mouthpiece and the earpiece, scrubbing an outer surface thereof, and then when the mouthpiece and the earpiece are removed from the plates, the springs expand and the shafts extend back into starting position, said device further including a compartment attached to each of the receptacles in which is journaled a roll of material treated with a disinfectant, each of said receptacles having a serrated edge on the first end of the perimetrical wall above the plates whereby when the roll is unwound such that some of the material overlies the plates, the serrated edge cuts the material into sheets as the mouthpiece and earpiece are pressed against the plates, the sheets then rotating with the plates.

5. The device of claim 4 wherein a resilient pad is mounted on an upper surface of the plates, said pad adapted to grip the sheet of material with a disinfectant such that the sheet rotates with the pad and the plate.

\* \* \* \* \*